2,979,460
LUBRICATING OIL THICKENED TO A GREASE CONSISTENCY WITH A MIXTURE OF AN ORGANO HYDANTOIN AND A SILICEOUS THICKENING AGENT

Paul R. McCarthy, Allison Park, and Joseph J. McGrath, Monroeville, Pa., assignors to Gulf Research & Development Company, Pittsburgh, Pa., a corporation of Delaware No Drawing. Filed June 15, 1959, Ser. No. 820,104

9 Claims. (Cl. 252—49.7)

This invention relates to improved lubricating compositions and more particularly to lubricants suitable for high temperature lubrication.

The trend in design of modern aircraft has accentuated the need for greases which will lubricate anti-friction bearings operating at high rotational speeds and high temperatures. While considerable progress has been made in recent years in producing improved aircraft greases some difficulty has been encountered in producing a grease which will effectively lubricate bearings operating at high rotational speeds and high temperatures for prolonged periods of time. Conventional aircraft greases currently available have failed to meet the stringent requirements on such a lubricant.

We have discovered that a lubricating composition having improved lubricating characteristics for an extended period of time when used to lubricate bearings operating at an elevated temperature under high rotational speeds can be obtained by incorporating into a lubricating oil in oil thickening proportions a mixture of an organo hydantoin having the following structural formula:

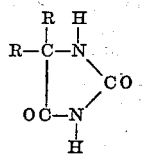

wherein R is selected from the group consisting of alkyl, aryl, alkaryl, aralkyl and cycloalkyl radicals, at least one R being a carbocyclic radical and a secondary organophilic siliceous oil thickening agent. Thus, the improved lubricating composition of our invention comprises a dispersion in a lubricating oil of a sufficient amount to thicken the lubricating oil to a grease consistency of a mixture of an organo hydantoin of the type designated by the above structural formula and an organophilic siliceous oil thickening agent.

It will be noted that at least one of the R's in the above formula must be a carbocyclic radical. So long as this requirement is satisfied, the remaining R's may be alkyl, aryl, alkaryl, aralkyl or cycloalkyl radicals. It is preferred, however, that both of the R's be carbocyclic radicals, especially phenyl radicals, because of the increased resonance or thermal stability contributed to the compound by such radicals.

The amount of the combined organo hydantoin and the organophilic siliceous material which we use is an amount sufficient to thicken the lubricating oil to a grease consistency. In general, this amount comprises about 10 to about 60 percent by weight of the total composition. The weight ratio of the hydantoin compound to the organophilic siliceous material will vary depending upon the characteristics desired in the ultimate composition. In general, however, the ratio of hydantoin compound to the organophilic siliceous material is between about 1:1 and about 20:1.

The organo hydantoins which we prefer are those wherein the sum of the carbon atoms in the R groups is 7 to 18. Thus, typical hydantoins within our preferred class are 5-methyl-5-phenyl hydantoin; 5-ethyl-5-phenyl hydantoin; 5-propyl-5-phenyl hydantoin; 5-butyl-5-phenyl hydantoin; 5-amyl-5-phenyl hydantoin; 5-hexyl-5-phenyl hydantoin; 5-cyclohexyl-5-phenyl hydantoin; 5-n-octyl-5-phenyl hydantoin; 5-isooctyl-5-phenyl hydantoin; 5,5-diphenyl hydantoin; 5-methyl-5-cresyl hydantoin; 5-n-octyl-5-cresyl hydantoin; 5-isooctyl-5-cresyl hydantoin; 5,5-dicresyl hydantoin; 5-methyl-5-benzyl hydantoin; 5-n-octyl-5-benzyl hydantoin; 5-isooctyl-5-benzyl hydantoin; 5,5-dibenzyl hydantoin; 5-cresyl-5-phenyl hydantoin; 5-methyl-5-cyclopentyl hydantoin; 5,5-dicyclopentyl hydantoin; 5-methyl-5-cyclohexyl hydantoin; 5-tertiary butyl-5-cyclohexyl hydantoin; 5-isooctyl-5-cyclohexyl hydantoin; 5,5-dicyclohexyl hydantoin; 5-methyl-5-naphthyl hydantoin; 5-isooctyl-5-naphthyl hydantoin; and the like.

The amount of the organo hydantoin used may vary over wide limits depending upon the particular oil with which the hydantoin compound is to be blended and upon the properties desired in the final lubricating composition. While as much as 50 percent by weight of the total composition may comprise the hydantoin compound, we prefer to use smaller amounts, that is, in the order of about 10 to 40 percent by weight. It should be understood, however, that, depending upon the consistency of the composition desired and upon the organophilic siliceous material used in combination therewith, less than 10 percent or more than 50 percent of the hydantoin compound may be employed.

The organophilic siliceous materials which we employ in the lubricating composition of this invention are exemplified by bentonite-organic base compounds known commercially as bentones and finely divided organo-siliceous solids such as the esterified siliceous solids known commercially as "Estersils." The amount of the organophilic siliceous material employed may vary over wide limits depending upon the particular compound employed, the particular oil with which the siliceous compound is blended and the properties desired in the ultimate composition. While the organophilic siliceous material may comprise as much as 20 percent by weight of the total composition, we prefer to use smaller amounts, that is, in the order of about 1 to about 10 percent by weight. It should be understood, however, that depending upon the consistency of the composition desired and upon the organo hydantoin content of the composition less than 1 percent or more than 10 percent of the organophilic siliceous material can be employed.

Typical bentonite-organic base compounds employed in accordance with the invention are compounds composed of a montmorillonite mineral in which at least a part of the cation content of the mineral has been replaced by an organic base. Clays that swell at least to some extent on being contacted with water and contain as a primary constituent a mineral of the group known as montmorillonites are generally referred to as bentonites. Such clays, which contain exchangeable alkali metal atoms either naturally or after treatment, constitute the raw materials employed in making the bentonite-organic base compounds used in the compositions of this invention. So far as known, all naturally occurring montmorillonites contain some magnesium and certain of them, as exemplified by Hector clay, contain such a high percentage of magnesium that they largely have magnesium in place of the aluminum content characteristic of the more typical montmorillonites.

The bentonite-organic base compounds are preferably prepared as described in U.S. Patent No. 2,033,856, issued March 10, 1936, by bringing together the bentonite and the organic base in the presence of aqueous mineral acid to effect base exchange. The organic bases should preferably be titratable with mineral acids. Among these reactive bases are many alkaloids, and cyclic, aliphatic, and heterocyclic amines. The bentonite-organic base compounds used in preparing the lubricating compositions of this invention are preferably those prepared by bringing together a bentonite clay and such organic bases as aliphatic amines, their salts, and quaternary ammonium salts. Examples of such amines and salts are: decylamine, dodecylamine, tetradecylamine, hexadecylamine, octadecylamine, hexadecyl ammonium acetate, octadecyl ammonium acetate, dimethyldioctyl ammonium acetate, dimethyldidodecyl ammonium acetate, dimethyldodecylhexadecyl ammonium acetate, dimethyldicetyl ammonium acetate, dimethylhexadecyloctadecyl ammonium acetate, dimethyldioctadecyl ammonium acetate, and the corresponding chlorides and quaternary ammonium chlorides. The organic bases employed should be such as to impart substantial organophilic properties to the resulting compounds. The preferred bentonite compounds are prepared from quaternary ammonium compounds in which the N-substituents are aliphatic groups containing at least one alkyl group with a total of at least 10 to 12 carbon atoms. When aliphatic amines are used they preferably contain at least one alkyl group containing at least 10 to 12 carbon atoms.

While the long chain aliphatic amine bentonite compounds are readily dispersible in practically all oil bases, dispersion of the short or single chain aliphatic amine bentonite compounds, in the oil, particularly mineral oils and synthetic oils other than ester lubricants, can be facilitated by the use of one or more solvating agents. Suitable solvating agents are polar organic compounds such as organic acids, esters, alcohols, ethers, ketones, and aldehydes, especially low molecular weight compounds of these classes. Examples of suitable solvating agents are: ethyl acetate, acetic acid, acetone, methyl alcohol, ethyl alcohol, benzoyl chloride, butyl stearate, coconut oil, cyclohexanone, ethylene dichloride, ethyl ether, furfural, isoamyl acetate, methyl ethyl ketone, and nitrobenzene. In cases where the use of a solvating agent is desirable for effecting more rapid and more complete dispersion of the organic bentonite compound in the oil, ordinarily only a relatively small amount of such agent may be necessary. However, as much as about 50 percent by weight based on the amount of the bentonite compound can be used.

Typical estersils employed in accordance with the invention are described in U.S. Patent No. 2,657,149, issued October 27, 1953, to R. K. Iler. The estersils are organophilic solids made by chemically reacting primary or secondary alcohols with certain siliceous solids. In brief, the estersils are powders or pulverulent materials the internal structure or "substrate" of which have an average specific surface area of from 1 to 900 square meters per gram. The substrate has a surface of silica which is coated with —OR' groups, the coating of —OR' groups being chemically bound to the silica. R' is a hydrocarbon radical of a primary or secondary alcohol containing from 2 to 18 carbon atoms. The carbon atom attached to the oxygen is also attached to hydrogen.

The estersil substrates are solid inorganic siliceous materials which contain substantially no chemically bound organic groups prior to esterification. The substrates are in a supercolloidal state of subdivision, indicating that whatever discrete particles are present are larger than colloidal size. In general, the supercolloidal substrates have at least one dimension of at least 150 millimicrons. The supercolloidal particles may be aggregates of ultimate units which are colloidal in size.

The estersils which we employ are advantageously those in which the ultimate units have an average diameter of 8 to 10 millimicrons. The substrates advantageously have specific surface areas of at least 25 square meters per gram and preferably at least 200 square meters per gram.

The estersils made from most alcohols become organophilic when they contain more than about 80 ester groups per 100 square millimicrons of surface of internal structure. They become more organophilic as the ester groups increase. Thus, the products which contain 100 ester groups per 100 square millimicrons of substrate surface are more organophilic than those that contain only 80 ester groups. When the estersils contain at least 200 ester groups per 100 square millimicrons of substrate surface, the estersils not only are organophilic but also are hydrophobic. Thus, the more highly esterified products are particularly desirable where the lubricant made therefrom comes in contact with water. When $C_3$ to $C_6$ alcohols are used in preparing the estersils, the estersils may contain from 300 to 400 ester groups per 100 square millimicrons of substrate surface. Thus, a preferred group of estersils are those prepared from the $C_3$ to $C_6$ alcohols. The estersils, as noted above, are powders or pulverulent materials. The estersil powders are exceedingly fine, light and fluffy. The bulk density of preferred estersils is in the order of 0.15 to 0.20 gram per cubic centimeter at 3 pounds per square inch and in the order of about 0.30 gram per cubic centimeter at 78 pounds per square inch. The estersils are available commercially and thus the estersils per se and their preparation constitute no part of this invention.

The lubricating oil in which the organo hydantoin and the secondary thickening agent are incorporated is preferably a lubricant of the type best suited for the particular use for which the ultimate composition is designed. Since many of the properties possessed by the lubricating oil are imparted to the ultimate lubricating composition, we advantageously employ an oil which is thermally stable at the contemplated lubricating temperature. Some mineral oils, especially hydrotreated mineral oils, are sufficiently stable to provide a lubricating base for preparing lubricants to be used under moderately elevated temperatures. Where temperatures in the order of 400° F. and above are to be encountered, synthetic oils form a preferred class of lubricating bases because of their high thermal stability. By the term "synthetic oil" we mean an oil of non-mineral origin. The synthetic oil can be an organic ester which has a majority of the properties of a hydrocarbon oil of lubricating grade such as di-2-ethylhexyl sebacate, dioctyl phthalate and dioctyl azelate. Instead of an organic ester, we can use polymerized olefins, copolymers of alkylene glycols and alkylene oxides, polyorgano siloxanes and the like.

The liquid polyorgano siloxanes because of their exceedingly high thermal stability form a preferred group of synthetic oils to which the organo hydantoin and organophilic siliceous materials are added. These polyorgano siloxanes are known commercially as silicones and are made up of silicon and oxygen atoms wherein the silicon atoms may be substituted with alkyl, aryl, alkaryl, aralkyl and cycloalkyl radicals. Exemplary of such compounds are the dimethyl silicone polymers, diethyl silicone polymers, ethyl-phenyl silicone polymers and methylphenyl silicone polymers.

If desired, a blend of oils of suitable viscosity may be employed as the lubricating oil base instead of a single oil by means of which any desired viscosity may be secured. Therefore, depending upon the particular use for which the ultimate composition is designed, the lubricating oil base may be a mineral oil, a synthetic oil, or a mixture of mineral and/or synthetic oils. The lubricating oil content of the compositions prepared according to this invention comprises about 40 to about 90 percent by weight of the total composition.

In compounding the compositions of the present invention, various mixing and blending procedures may be used. In a preferred embodiment of the invention, the lubricating oil, the organo hydantoin and the secondary thickener together with a solvating agent and conventional lubricant additives, if desired, are mixed together at room temperature for a period of 10 to 30 minutes to form a slurry. During this initial mixing period some thickening is evidenced. Some lumps may be formed. The slurry thus formed is then subjected to a conventional milling operation in a ball mill, a colloid mill, homogenizer or similar device used in compounding greases to give the desired degree of dispersion. In the illustrative compositions of this invention, the slurry was passed twice, by means of a pump, through a Premier colloid mill set at a stator-rotor clearance of 0.002 inch. Maximum thickening occurred on the second pass through the mill.

The lubricating composition of this invention can contain conventional lubricant additives, if desired, to improve other specific properties of the lubricant without departing from the scope of the invention. Thus, the lubricating composition can contain a filler, a corrosion and rust inhibitor, an extreme pressure agent, an anti-oxidant, a metal deactivator, a dye, and the like. Whether or not such additives are employed and the amounts thereof depend to a large extent upon the severity of the conditions to which the composition is subjected and upon the stability of the lubricating oil base in the first instance. Since the polyorgano siloxanes, for example, are in general more stable than mineral oils, they require the addition of very little, if any, oxidation inhibitor. When such conventional additives are used they are generally added in amounts between about 0.01 and 5 percent by weight based on the weight of the total composition.

In order to illustrate the lubricating characteristics at an elevated temperature and high rotational speeds, grease compositions of the invention were subjected to the test procedure outlined by the Coordinating Research Council Tentative Draft (July 1954), "Research Technique for the Determination of Performance Characteristics of Lubricating Grease in Antifriction Bearings at Elevated Temperatures," CRC Designation L-35. According to this procedure, 3 grams of the grease to be tested are placed in a bearing assembly containing an eight-ball SAE No. 204 ball bearing. The bearing assembly which is mounted on a horizontal spindle is subjected to a radial load of 5 pounds. The portion of the spindle upon which the test bearing assembly is located is encased in a thermostatically controlled oven. By this means the temperature of the bearing can be maintained at a desired elevated temperature which in the tests reported hereinafter was 400° F. The spindle is driven by a constant belt-tension motor drive assembly, capable of giving spindle speeds up to 10,000 revolutions per minute. The spindle is operated on a cycling schedule consisting of a series of periods, each period consisting of 20 hours running time and 4 hours shutdown time. The test continues until the lubricant fails. The lubricant is considered to have failed when any one of the following conditions occurs, (1) spindle input power increases to a value approximately 300 percent above the steady state condition at the test temperature; (2) an increase in temperature at the test bearing of 20° F. over the test temperature during any portion of a cycle; or (3) the test bearing locks or the drive belt slips at the start or during the test cycle.

The oil used in preparing the lubricating compositions summarized in Table I was a synthetic oil known commercially as GE Silicone 81717. GE Silicone 81717 is marketed by General Electric Company and is a water-white to amber liquid polymer of the general formula

$[-(CH_3)_2-SiOSi-(CH_3)_2-OSi(CH_3)_2O-]_x$

It has a viscosity at −65° F. of 3487 centistokes, at 0° F. of 390 centistokes, at 100° F. of 71.3 centistokes, at 210° F. of 22 centistokes and at 700° F. of 1.9 centistokes.

The Estersil GT employed is marketed by E. I. du Pont de Nemours and Company and consists of an amorphous silica coated with approximately 340 butoxy groups per 100 square millimicrons of surface. The product is a white granular solid comprising 88 to 89 percent $SiO_2$ having an ultimate particle size of 8 to 10 millimicrons. The surface area comprises about 285 to 335 square meters per gram. The product has a pH in a 50-50 methanol-water mixture of 8.0 to 9.0 and a bulk density of 19 to 20 pounds per cubic foot.

In preparing the lubricating compositions, the oil, the 5,5-diphenyl hydantoin and the dimethyldicetylammonium bentonite or estersil were mixed at room temperature for a period of 10 to 30 minutes. The slurry thus formed was passed twice through a Premier colloid mill set at a stator-rotor clearance of 0.002 inch. The thickened lubricating compositions thus prepared had the following approximate make-up.

*Table I*

| Composition, Percent By Weight | A | B |
|---|---|---|
| Lubricating Oil, G.E. Silicone 81717 | 63 | 63 |
| 5,5,-Diphenylhydantoin | 33 | 33 |
| Secondary Thickener, Dimethyldicetylammonium bentonite | 4 | |
| Estersil GT | | 4 |
| Inspection: | | |
| Penetration (ASTM D217-52T)— | | |
| Unworked | 348 | 268 |
| Worked | 375 | 406 |
| Dropping Point, ° F. (ASTM D566-42) | 450+ | 450+ |
| Performance Life, hrs., 10,000 r.p.m. at 400° F. | 504 | 606 |

The long performance life of the compositions of the invention at a high rotational speed and a high temperature is self evident from the above data. When Composition A was subjected even to a more serere test using Pope spindles and an MRC 204 S-17 bearing at 400° F. and 20,000 revolutions per minute no failure was recorded even after 502 hours of operation.

An additional lubricating composition of the invention similar to Composition A was prepared except 30 parts of the GE Silicone 81717 were replaced with 30 parts of DC 550 Fluid marketed by Dow-Corning Corporation. This fluid is a methylphenyl-siloxane polymer having as typical characteristics a viscosity at 100° F. of 300 to 400 SUS, a viscosity-temperature coefficient of 0.75, a freezing point of −54° F., a flash point of 600° F. and a specific gravity 25° C./25°C. of 1.08. When this composition was tested in the more severe test referred to above at 20,000 revolutions per minute, there was no failure even after 548 hours of operation.

Other lubricating compositions within the scope of the invention are illustrated in Table II.

Table II

| Composition, Percent By Weight | C | D | E | F | G | H | I | J | K | L | M | N | O | P | Q |
|---|---|---|---|---|---|---|---|---|---|---|---|---|---|---|---|
| Lubricating: | | | | | | | | | | | | | | | |
| DC 550 Fluid | 64 | 70 | 70 | 64 | 64 | 47.5 | 70 | 80 | | | | | | | |
| Di-2-ethylhexyl sebacate | | | | | | | | | 70 | 70 | 60 | 60 | 70 | 64 | 60 |
| Organo Hydantoin: | | | | | | | | | | | | | | | |
| 5-Methy-5-phenyl hydantoin | | 24 | | | | | | | 20 | | | | | | |
| 5-Isooctyl-5-cyclohexyl hydantoin | | | 24 | | | | | | | 25 | | | | | |
| 5,5-Dicyclohexyl hydantoin | | | | | 32 | | | 10 | | | 35 | | | | |
| 5,5-Diphenyl hydantoin | 32 | | | 30 | | 50 | 20 | | | | | 30 | 25 | 32 | 36 |
| Secondary Thickener: | | | | | | | | | | | | | | | |
| Dimethyldicetylammonium bentonite | 4 | | | | | | 10 | 10 | 10 | 5 | | | | | 4 |
| Dimethyldidodecylammonium bentonite | | 6 | | | | | | | | | 5 | | | | |
| Dimethyldioctylammonium bentonite | | | 6 | | | | | | | | | 10 | | | |
| Dimethyldioctadecylammonium bentonite | | | | 6 | | | | | | | | | 5 | | |
| Estersil GT | | | | | 4 | 2.5 | | | | | | | | 4 | |
| Ratio of hydantoin to secondary thickener | 8:1 | 4:1 | 4:1 | 5:1 | 8:1 | 20:1 | 2:1 | 1:1 | 2:1 | 5:1 | 7:1 | 3:1 | 5:1 | 8:1 | 9:1 |

While our invention has been described with reference to various specific examples and embodiments, it will be understood that the invention is not limited to such examples and embodiments and may be variously practiced within the scope of the claims hereinafter made.

We claim:

1. A lubricating composition comprising a dispersion in a lubricating oil of a sufficent amount to thicken the lubricating oil to a grease consistency of a mixture of an organo hydantoin having the following structural formula:

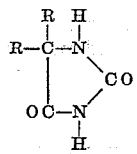

where R is selected from the group consisting of alkyl, aryl, alkaryl, aralkyl and cycloalkyl radicals, at least one R being a carbocyclic radical and the sum of the carbon atoms in the R groups is 7 to 18 and an organophilic siliceous oil thickening agent, the weight ratio of the organo hydantoin to the organophilic siliceous material in said mixture being about 1:1 to 20:1.

2. The lubricating composition of claim 1 wherein the combined organo hydantoin and organophilic siliceous material comprises about 10 to 60 percent by weight of the total composition.

3. The lubricating composition of claim 1 wherein the lubricating oil is a polyorgano siloxane.

4. The lubricating composition of claim 1 wherein the organophilic siliceous oil thickening agent is a bentonite-organic base compound.

5. The lubricating composition of claim 1 wherein the organophilic siliceous oil thickening agent is an organophilic estersil comprising a supercolloidal substrate coated with —OR' groups, the substrate having a surface of silica and having a specific surface area of from 1 to 900 square meters per gram, the coating of —OR' groups being chemically bound to said silica and R' being a hydrocarbon radical of from 2 to 18 carbon atoms, wherein the carbon attached to oxygen is also attached to hydrogen.

6. A lubricating composition comprising a dispersion in a liquid polyorgano siloxane of a sufficient amount to thicken the polyorgano siloxane to a grease consistency of a mixture of an organo hydantoin having the following structural formula:

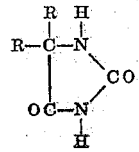

wherein R is selected from the group consisting of alkyl, aryl, alkaryl, aralkyl and cycloalkyl radicals, at least one R being a carbocyclic radical and the sum of the carbon atoms in the R groups is 7 to 18 and an organophilic bentonite-organic base compound, the weight ratio of the organo hydantoin to the organophilic bentonite-organic base compound in said mixture being about 1:1 to 20:1.

7. The lubricating composition of claim 6 wherein the organo hydantoin is 5,5-diphenyl hydantoin and the bentonite-organic base compound is dimethyldicetylammonium bentonite.

8. A lubricating composition comprising a dispersion in a liquid polyorgano siloxane of a sufficient amount to thicken the polyorgano siloxane to a grease consistency of a mixture of an organo hydantoin having the following structural formula:

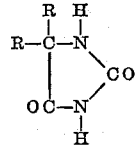

wherein R is selected from the group consisting of alkyl, aryl, alkaryl, aralkyl and cycloalkyl radicals, at least one R being a carbocyclic radical and the sum of the carbon atoms in the R groups is 7 to 18 and an organophilic estersil, the weight ratio of the organo hydantoin to the organophilic estersil in said mixture being about 1:1 to 20:1, said organophilic estersil comprising a supercolloidal substrate coated with —OR' groups, the substrate having a surface of silica and having a specific surface area of from 25 to 900 square meters per gram, the coating of —OR' groups being chemically bound to said silica and R' being a hydrocarbon radical of from 3 to 6 carbon atoms, wherein the carbon atom attached to oxygen is also attached to hydrogen.

9. The lubricating composition of claim 8 wherein the organo hydantoin is 5,5-diphenyl hydantoin and the organophilic estersil is an amorphous silica coated with about 340 butoxy groups per 100 square millimicrons of surface.

References Cited in the file of this patent

UNITED STATES PATENTS

| 2,820,763 | Hughes et al. | Jan. 21, 1958 |
| 2,875,152 | Van Scoy | Feb. 24, 1959 |
| 2,917,457 | Preiss | Dec. 15, 1959 |

OTHER REFERENCES

Chem. Abstracts, vol. 41, page 7392b, 1947.
Chem. Abstracts, vol. 47, page 5894d, 1953.

UNITED STATES PATENT OFFICE

CERTIFICATE OF CORRECTION

Patent No. 2,979,460                                        April 11, 1961

Paul R. McCarthy et al.

It is hereby certified that error appears in the above numbered patent requiring correction and that the said Letters Patent should read as corrected below.

Column 2, line 45, for "bentones" read -- Bentones --.

Signed and sealed this 5th day of December 1961.

(SEAL)
Attest:

ERNEST W. SWIDER
Attesting Officer

DAVID L. LADD
Commissioner of Patents

USCOMM-DC